US009099897B2

(12) United States Patent
Neuenschwander et al.

(10) Patent No.: US 9,099,897 B2
(45) Date of Patent: Aug. 4, 2015

(54) METHOD FOR CONNECTING END SECTIONS OF AN ANNULAR LAMINATED ARTICLE AND ARTICLES MADE THEREFROM

(75) Inventors: Thomas R. Neuenschwander, Fort Wayne, IN (US); Barry A. Lee, Fort Wayne, IN (US)

(73) Assignee: L.H. Carbide Corporation, Fort Wayne, IN (US)

( * ) Notice: Subject to any disclaimer, the term of this patent is extended or adjusted under 35 U.S.C. 154(b) by 304 days.

(21) Appl. No.: 13/611,505

(22) Filed: Sep. 12, 2012

(65) Prior Publication Data

US 2013/0062989 A1   Mar. 14, 2013

Related U.S. Application Data

(60) Provisional application No. 61/533,966, filed on Sep. 13, 2011.

(51) Int. Cl.
| H02K 1/18 | (2006.01) |
| B23P 11/00 | (2006.01) |
| H02K 1/14 | (2006.01) |
| H02K 15/02 | (2006.01) |

(52) U.S. Cl.
CPC ............. *H02K 1/148* (2013.01); *B23P 11/005* (2013.01); *H02K 15/022* (2013.01); *Y10T 29/49826* (2015.01); *Y10T 29/49938* (2015.01)

(58) Field of Classification Search
CPC ... H02K 15/022; H02K 15/026; H02K 1/148; B23P 11/005; Y10T 29/49938; Y10T 29/49826

USPC .......... 310/216.004, 254.1, 216.009
See application file for complete search history.

(56) References Cited

U.S. PATENT DOCUMENTS

| 3,202,851 | A | * | 8/1965 | Dehlendorf et al. ... 310/216.048 |
| 3,225,424 | A | | 12/1965 | Wiley |
| 4,002,049 | A | * | 1/1977 | Randolph, Sr. ................. 72/388 |
| 4,597,168 | A | * | 7/1986 | Oboshi et al. ................... 29/596 |
| 4,990,809 | A | | 2/1991 | Artus et al. |
| 5,349,741 | A | * | 9/1994 | Neuenschwander ............ 29/598 |
| 5,583,387 | A | | 12/1996 | Takeuchi et al. |
| 5,729,072 | A | | 3/1998 | Hirano et al. |
| 5,755,023 | A | | 5/1998 | Neuenschwander |
| 5,771,565 | A | | 6/1998 | Walters |

(Continued)

FOREIGN PATENT DOCUMENTS

| JP | 2000-295801 A | 10/2000 |
| JP | 2001-136700 A | 5/2001 |
| JP | 2009-065834 A | 3/2009 |

*Primary Examiner* — Alex W Mok
(74) *Attorney, Agent, or Firm* — Faegre Baker Daniels LLP

(57) ABSTRACT

A method for securing the end sections of an annular laminated article, such as a stator core, which includes a plurality of serially joined sections, each section formed of a plurality of stacked, planar laminas. The article is initially manufactured in a liner form, and is then formed into an annular form with the end sections disposed adjacent one another. At least one tab associated with one of the end sections is displaced by a forming tool into a corresponding cavity of the other of the end sections to secure the end sections together. In another embodiment, a pair of tabs each associated with one of the end sections are respectively displaced toward one another and into corresponding respective cavities each associated with the other of the end sections to secure the end sections together.

24 Claims, 13 Drawing Sheets

(56) References Cited

U.S. PATENT DOCUMENTS

| | | |
|---|---|---|
| 5,786,651 A | 7/1998 | Suzuki |
| 5,799,387 A | 9/1998 | Neuenschwander et al. |
| 5,826,323 A | 10/1998 | Walters |
| 5,859,486 A | 1/1999 | Nakahara et al. |
| 5,918,359 A * | 7/1999 | Neuenschwander ......... 29/564.2 |
| 5,937,503 A | 8/1999 | Walters |
| 6,000,119 A | 12/1999 | Neuenschwander et al. |
| 6,121,711 A | 9/2000 | Nakahara et al. |
| 6,127,753 A | 10/2000 | Yamazaki et al. |
| 6,131,268 A | 10/2000 | Neuenschwander |
| 6,147,431 A | 11/2000 | Asao et al. |
| 6,163,949 A | 12/2000 | Neuenschwander |
| 6,167,610 B1 | 1/2001 | Nakahara et al. |
| 6,219,900 B1 | 4/2001 | Suzuki |
| 6,226,856 B1 | 5/2001 | Kazama et al. |
| 6,323,571 B1 | 11/2001 | Nakahara et al. |
| 6,362,553 B1 | 3/2002 | Nakahara et al. |
| 6,369,687 B1 * | 4/2002 | Akita et al. .................... 336/234 |
| 6,504,284 B1 | 1/2003 | Kazama et al. |
| 6,538,548 B2 | 3/2003 | Akita et al. |
| 6,583,530 B2 * | 6/2003 | Hsu ............... 310/418 |
| 6,630,766 B1 | 10/2003 | Kirn et al. |
| 6,646,535 B2 | 11/2003 | Miyake et al. |
| 6,658,721 B2 | 12/2003 | Kazama et al. |
| 6,659,385 B2 | 12/2003 | Akita et al. |
| 6,744,166 B2 | 6/2004 | Harter et al. |
| 6,745,458 B2 | 6/2004 | Neuenschwander |
| 6,759,785 B2 * | 7/2004 | Miyake et al. ............. 310/254.1 |
| 6,784,587 B2 * | 8/2004 | Miyake et al. ........ 310/216.001 |
| 6,847,285 B2 | 1/2005 | Sirois et al. |
| 6,856,064 B2 | 2/2005 | Masumoto et al. |
| 6,858,964 B2 | 2/2005 | Masumoto et al. |
| 6,919,665 B2 | 7/2005 | Murakami et al. |
| 6,924,575 B2 | 8/2005 | Baumeister et al. |
| 6,930,428 B2 | 8/2005 | Grundl et al. |
| 7,062,841 B2 * | 6/2006 | Neuenschwander ............ 29/609 |
| 7,111,380 B2 | 9/2006 | Sheeran et al. |
| 7,120,985 B2 | 10/2006 | Nouzumi |
| 7,185,418 B2 | 3/2007 | Miyake et al. |
| 7,282,830 B2 | 10/2007 | Harrer et al. |
| 7,345,397 B2 | 3/2008 | Sheeran et al. |
| 7,348,706 B2 | 3/2008 | Ionel et al. |
| 7,368,844 B2 * | 5/2008 | Hashiba et al. ........ 310/216.048 |
| 7,414,347 B2 | 8/2008 | Wang et al. |
| 7,471,025 B2 | 12/2008 | Sheeran et al. |
| 7,576,467 B2 | 8/2009 | Yamamoto et al. |
| 7,583,001 B2 | 9/2009 | Lu et al. |
| 7,583,002 B2 | 9/2009 | Lyle et al. |
| 7,586,231 B2 | 9/2009 | Wang et al. |
| 7,615,907 B2 | 11/2009 | Fei et al. |
| 7,667,367 B2 | 2/2010 | Matsuo et al. |
| 7,667,368 B2 | 2/2010 | Matsuzaki et al. |
| 7,667,377 B2 | 2/2010 | Yamamoto et al. |
| 7,698,803 B2 * | 4/2010 | Mitsui et al. .................... 29/596 |
| 7,777,387 B2 | 8/2010 | Nagai et al. |
| 7,814,642 B1 | 10/2010 | Onimaru et al. |
| 7,821,175 B2 | 10/2010 | Ionel et al. |
| 7,928,627 B2 | 4/2011 | Nagai et al. |
| 2004/0051417 A1 | 3/2004 | Yamazaki et al. |
| 2004/0056556 A1 * | 3/2004 | Fujita ............................ 310/217 |
| 2006/0108891 A1 * | 5/2006 | Fujita ............................ 310/217 |
| 2006/0186753 A1 | 8/2006 | Yang et al. |
| 2007/0011866 A1 * | 1/2007 | Lee et al. ......................... 29/609 |
| 2007/0182268 A1 * | 8/2007 | Hashiba et al. ............... 310/217 |
| 2008/0047131 A1 * | 2/2008 | Neuenschwander et al. ... 29/609 |
| 2008/0098587 A1 * | 5/2008 | Mitsui et al. ..................... 29/598 |
| 2009/0026851 A1 * | 1/2009 | Liou ............................... 310/42 |
| 2009/0066183 A1 * | 3/2009 | Aramaki et al. .............. 310/217 |
| 2009/0085415 A1 * | 4/2009 | Ionel et al. ...................... 310/43 |
| 2009/0133243 A1 | 5/2009 | Akita |
| 2009/0134739 A1 | 5/2009 | Akita |
| 2010/0109470 A1 | 5/2010 | Lyle |
| 2010/0231084 A1 | 9/2010 | Kinoshita |

* cited by examiner

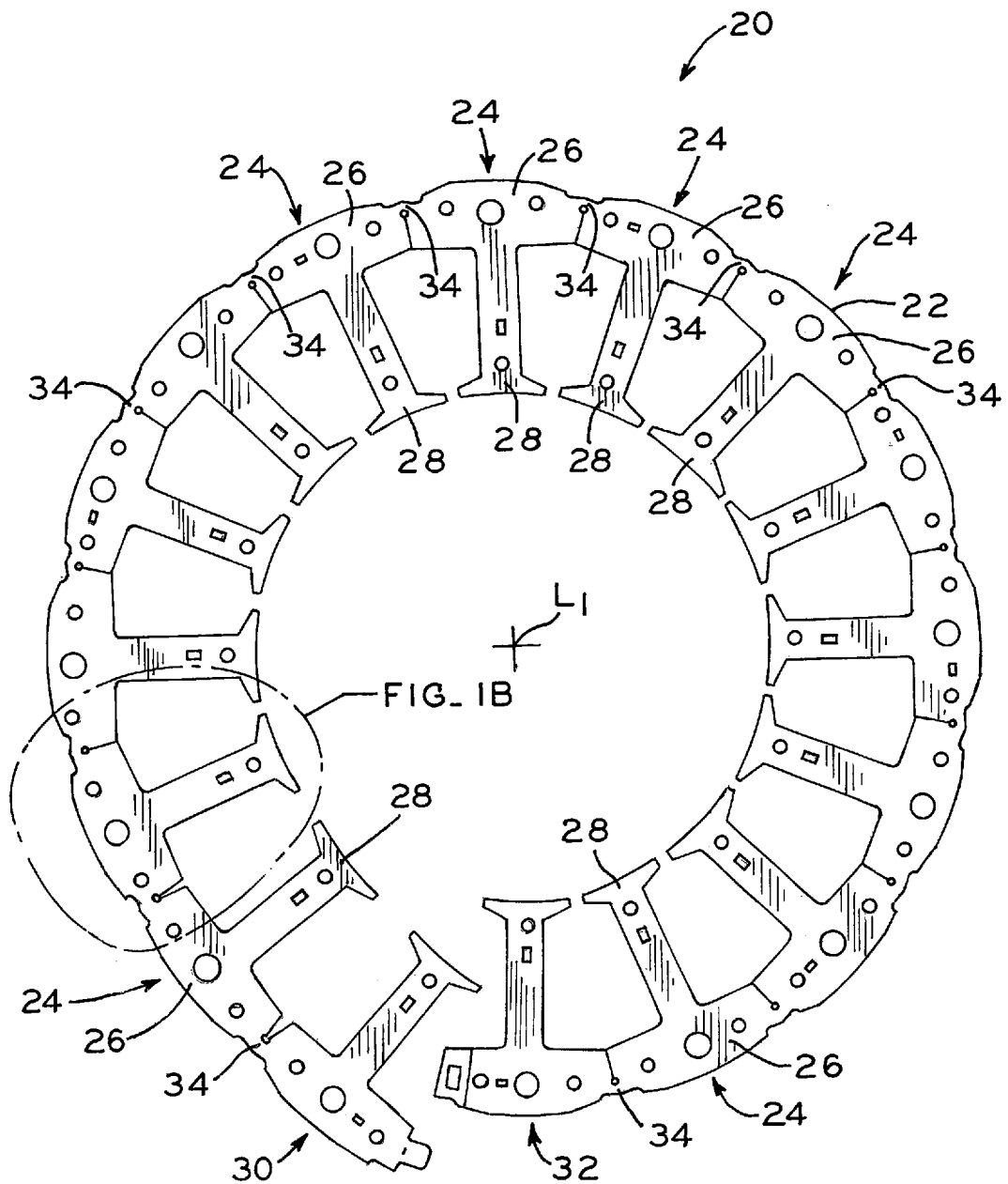
FIG_1A

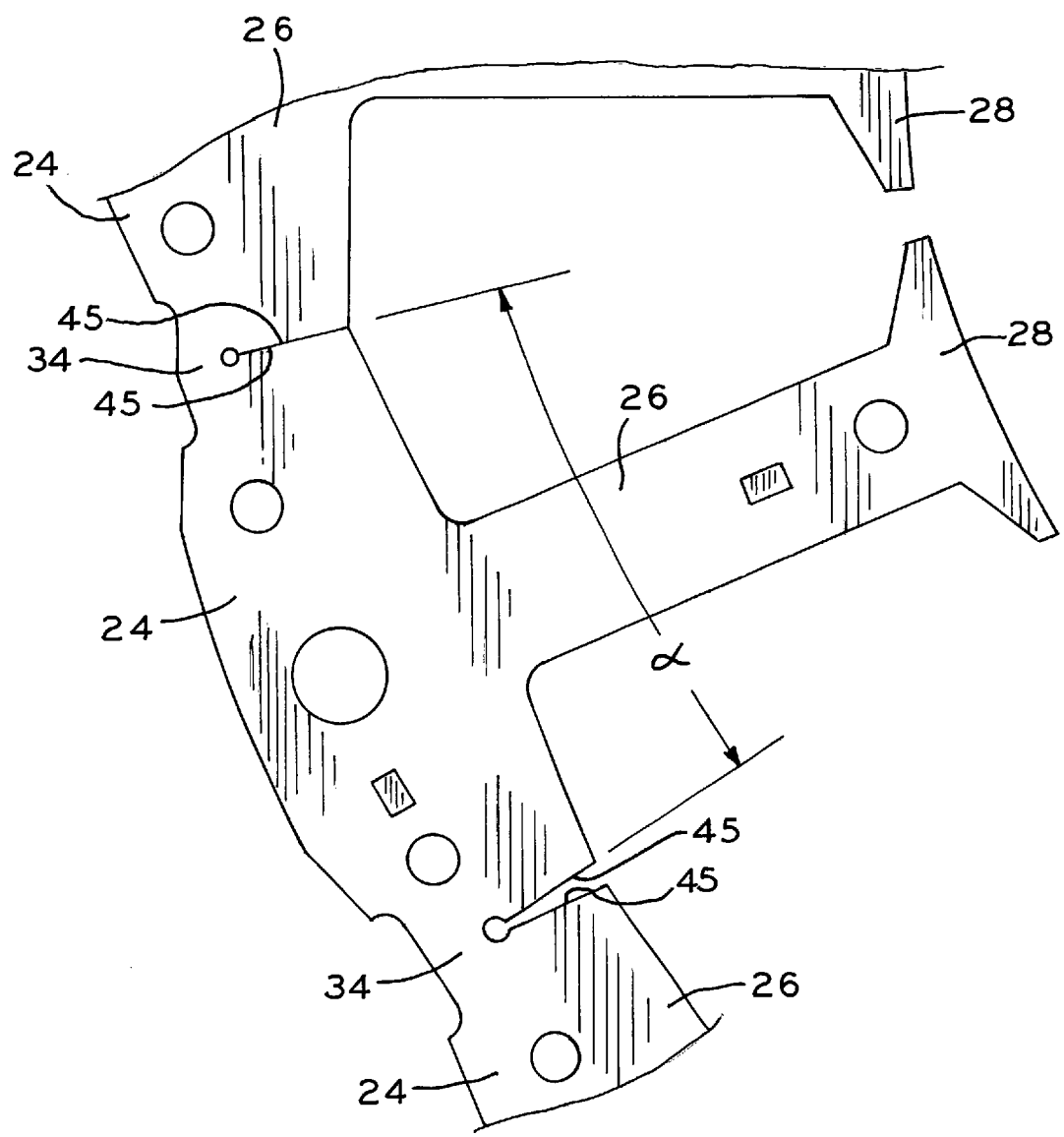
FIG_1B

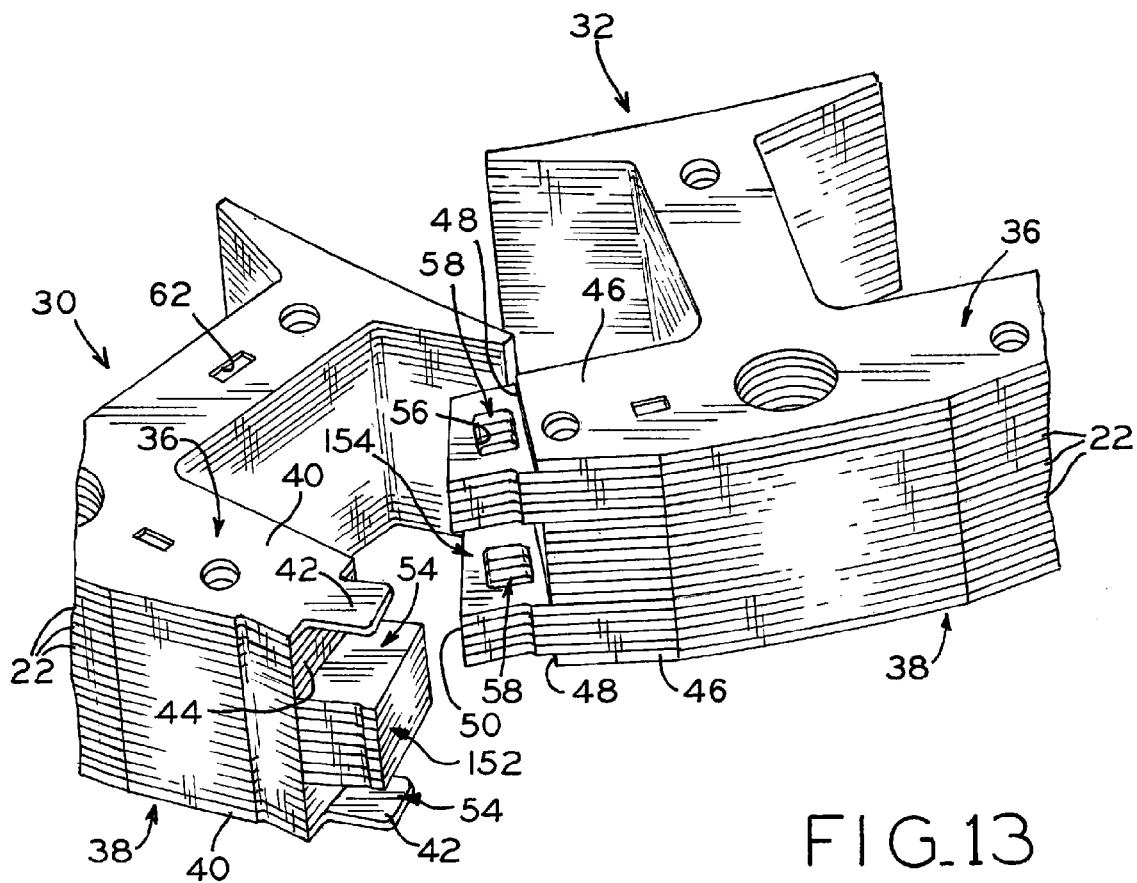
FIG_13
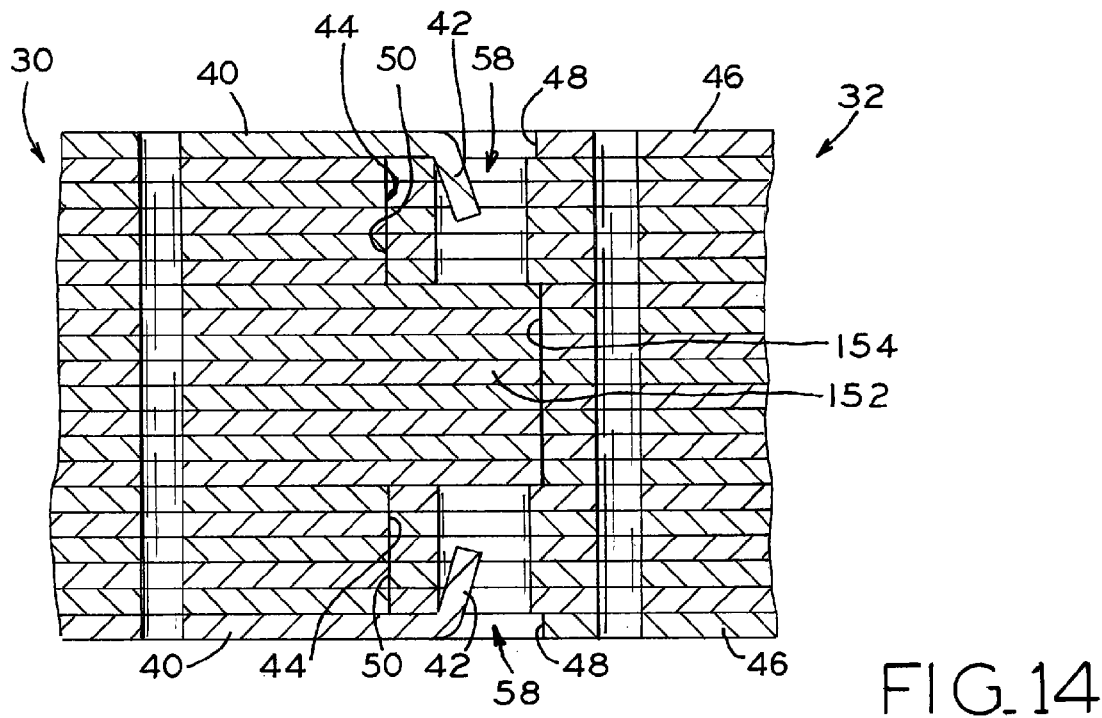
FIG_14

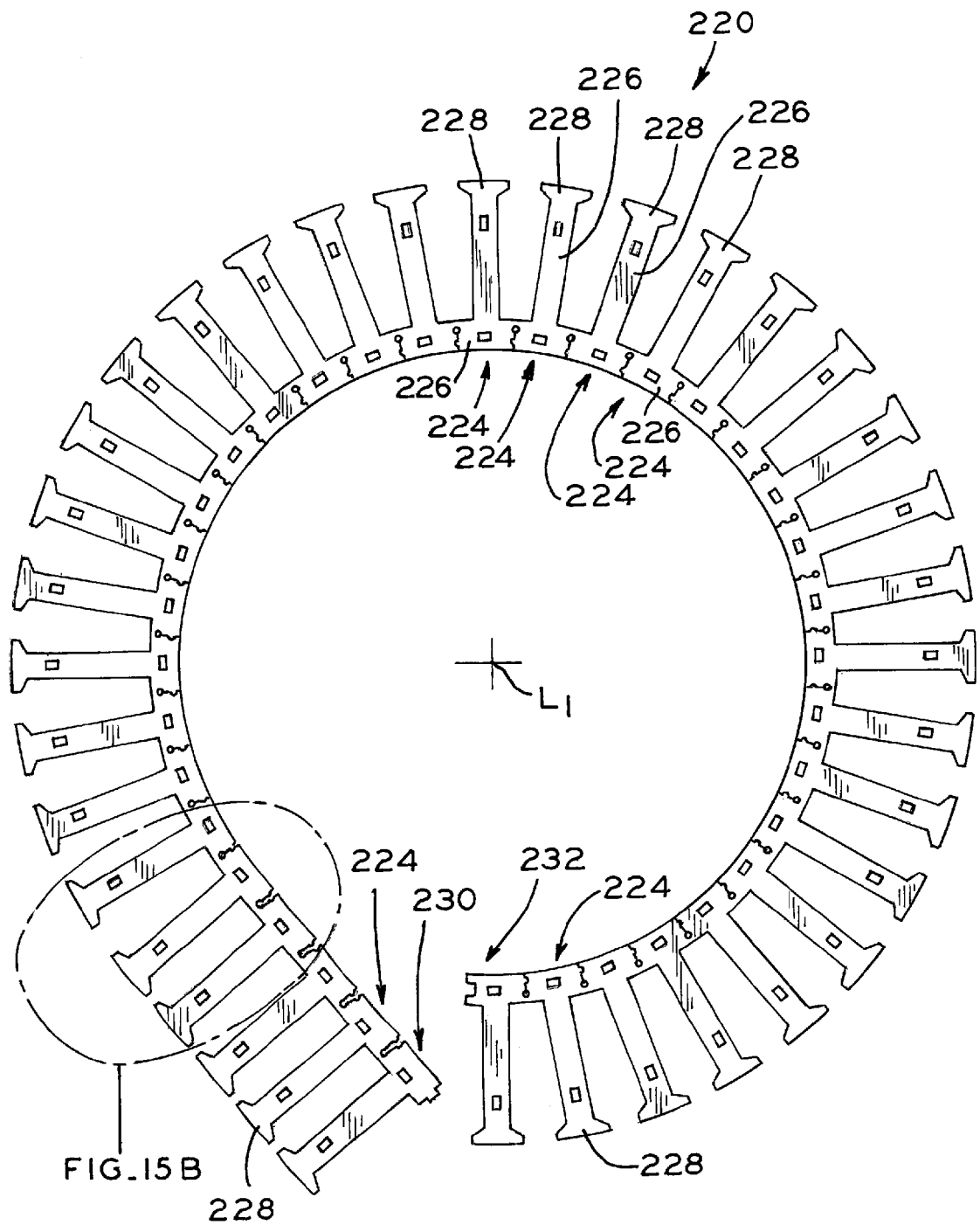
FIG_15A

METHOD FOR CONNECTING END SECTIONS OF AN ANNULAR LAMINATED ARTICLE AND ARTICLES MADE THEREFROM

CROSS-REFERENCE TO RELATED APPLICATIONS

This application claims the benefit under Title 35, U.S.C. §119(e) of U.S. Provisional Patent Application Ser. No. 61/533,966, entitled "Method For Connecting End Sections Of An Annular Laminated Article And Articles Made Therefrom", filed on Sep. 13, 2011, the entire disclosure of which is expressly incorporated by reference herein in its entirety.

BACKGROUND

1. Field of the Disclosure

The present disclosure relates to a method for connecting the end sections of an annular laminated article, and articles made therefrom.

2. Description of the Related Art

It is well known to manufacture annular laminated articles, such as stator cores for electric motors, in a manner in which annular laminas are stamped by a progressive die apparatus from a strip of steel stock material and then stacked and interlocked to form the article.

The main disadvantage of this arrangement is that, because each annular lamina is formed as a single piece, the width of the steel strip must be at least as large as the outer diameter of the lamina. Thus, a relatively large amount of the material is wasted, both within the interior of the annular laminas and in the spaces between the annular laminas. In the past, material waste was minimized by manufacturing a rotor core from the central portion of the stator laminas and/or by stamping the stator laminas in rows that are staggered with respect to one another. However, this advantage is not available for motors which lack traditional rotors and/or for motors having large diameter stators.

One known method of minimizing material waste is to initially form a laminated article in linear form, such as a stator core assembly in which adjacent core sections or pole pieces are connected by hinge structures. Then, the linear laminated article is formed into an annular shape by bending or pivoting the sections about the hinge structures followed by connecting end sections of the article together such as by welding, for example.

What is desired is an improved method for connecting the end sections of an annular laminated article.

SUMMARY

The present disclosure provides a method for securing the end sections of an annular laminated article, such as a stator core, which includes a plurality of serially joined sections, each section formed of a plurality of stacked, planar laminas. The article is initially manufactured in a linear form, and is then formed into an annular form with the end sections disposed adjacent one another. At least one tab associated with one of the end sections is displaced by a forming tool into a corresponding cavity of the other of the end sections to secure the end sections together. In another embodiment, a pair of tabs each associated with one of the end sections are respectively displaced toward one another and into corresponding respective cavities each associated with the other of the end sections to secure the end sections together.

In one form thereof, the present invention provides an annular laminated article, including a plurality of serially joined sections each formed of a plurality of stacked, planar laminas, the plurality of sections including a first end section and a second end section connected by a joint including a first lamina of the first end section disposed within a plane and having at least one first tab; and at least second and third laminas of the second end section each having apertures, the apertures together defining a first cavity, the tab displaced from the plane and extending into the cavity to secure the first and second end sections together with the first and second end sections in abutment with one another.

In another form thereof, the present invention provides an annular laminated article, including a plurality of sections each formed of a plurality of stacked, planar laminas, the plurality of sections connected to one another by joints, at least one of the joints including a first end section including a first lamina disposed within a first plane, the first lamina having at least one first tab; and a second end section including at least second and third adjacent laminas disposed within respective second and third planes, the second and third laminas having respective aligned apertures together defining a first cavity, the tab displaced from the first plane and received within the first cavity to secure the first and second end sections together.

In a further form thereof, the present invention provides a method for securing end sections of a laminated article, the method including the steps of: manufacturing a laminated article formed of a plurality of serially joined sections, each section formed of a plurality of stacked, planar laminas; forming the article into annular form with the end sections adjacent one another; displacing at least one tab associated with one of the end sections into a corresponding cavity of the other of the end sections to secure the end sections together.

BRIEF DESCRIPTION OF THE DRAWINGS

The above-mentioned and other features of the disclosure, and the manner of attaining them, will become more apparent and will be better understood by reference to the following description of embodiments of the invention taken in conjunction with the accompanying drawings, wherein:

FIG. 1A is a top plan view of an annular laminated article having end sections for connection in accordance with the present invention;

FIG. 1B is a top plan view of a portion of the annular laminated article shown in FIG. 1A;

FIG. 13 is a fragmentary perspective view of the unconnected end sections of a annular laminated article according to another embodiment;

FIG. 14 is a sectional view taken through the connected end sections of the annular laminated article of FIG. 13

FIG. 15A is a top plan view of an alternative annular laminated article having end sections for connection in accordance with the present invention.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 2:
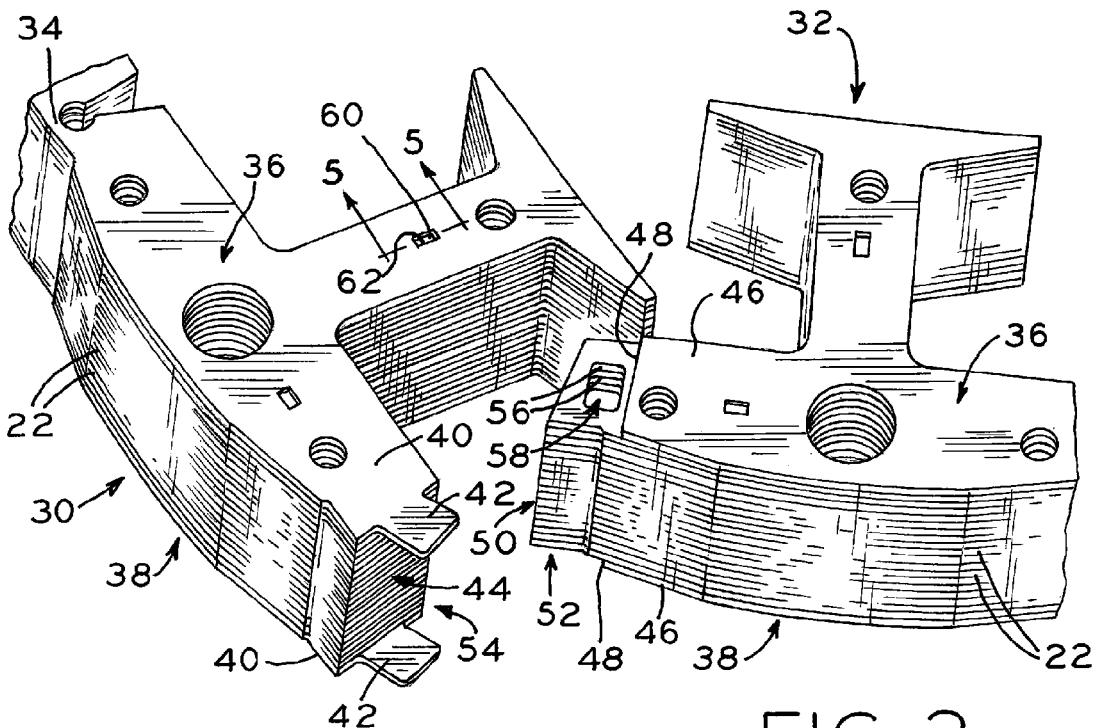
FIG. 2 is a fragmentary perspective view of the unconnected end sections of the annular laminated article of FIG. 1A.
Figure 3:
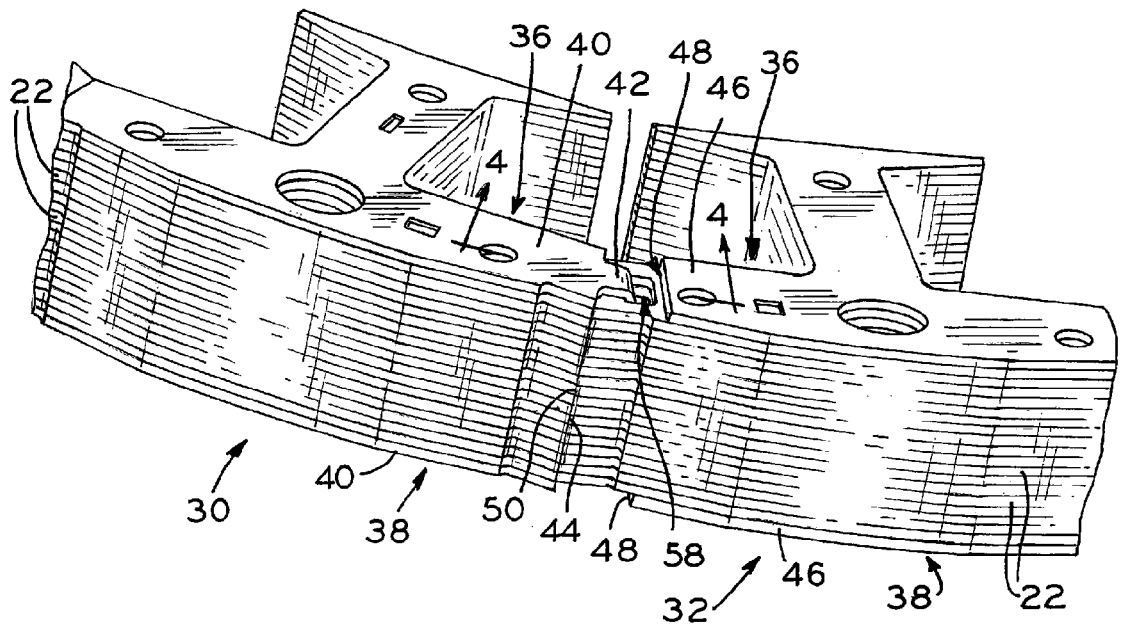
FIG. 3 is a fragmentary perspective view of the connected end sections of the annular laminated article of FIG. 1A.

Referring now to FIG. 1A, an annular laminated article 20 is shown, which includes at least one pair of end sections, also shown in FIGS. 2 and 3, that are connected to one another in accordance with the present invention. Annular laminated article 20 of the type shown in FIGS. 1A-3 and described further below is initially manufactured as a linear article including multiple layers of stacked individual planar laminas 22 (see FIGS. 2 and 3) that are punched from a sheet of metal strip stock material by a progressive die assembly. Article 20 is then formed into the annular form shown in FIG. 1A in the manner described below. Article 20 includes a plurality of serially joined sections 24 each generally including a core portion 26 and a pole piece portion 28 extended radially inwardly from core portion 26. Sections 24 include first and second end sections 30 and 32 connected at a joint described in further detail below. Article 20 may be a motor stator core having windings (not shown) wound about pole piece portions 28 or, alternatively, may be a motor rotor or any other type of annular laminated article. Depending on the size of article 20, for example, article 20 may include multiple joints each formed by first and second end sections 30 and 32 of the type described herein.

Annular laminated article 20 has a longitudinal axis $L_1$ extending centrally through article 20 when article 20 is formed into the generally cylindrical shape utilized in service in a motor assembly. This generally cylindrical shape, with the exception of the last end section 30, is shown in FIG. 1A. As used herein, "axial" and "axial direction" refer to longitudinal axis $L_1$ and/or its direction, while "radial" and "radial direction" refer to a direction perpendicular to longitudinal axis $L_1$.

Sections 24 are connected to one another via hinges 34 which, in one embodiment, comprise bridges of material extending between and integrally connecting core portions 26 of adjacent sections 24. In one embodiment, hinges 34 are deformable to facilitate bending of the laminated article 20 about longitudinal axis $L_1$ from its initial linear form into the annular form shown in FIG. 1A. In other embodiments, sections 24 may be mechanically connected to one another using other arrangements, such as by hinge pins (not shown), or by any other arrangement which allows laminated article 20 to be formed from its initial linear form into the annular form shown in FIG. 1A.

The reconfiguration of laminated article 20 from the its as-manufactured linear form into the annular form of FIG. 1A is facilitated by the geometry of end walls 45, which cooperate to define angle α as illustrated in FIG. 1B. Angle α results in a gap being formed between adjacent end walls 45 of neighboring sections 24 when in the linear form, as illustrated for the bottom neighboring pair of sections 24 which have not yet been reconfigured. When so reconfigured into the annular form, end walls 45 abut one another and can thereby define the limit of inward movement of neighboring sections 24 toward one another. The value of angle α depends upon the number of sections 24 and the overall size and diameter of laminated article 20, and can be calculated to produce abutting neighboring sections 24 for particular design sizes and configurations.

Referring to FIG. 2, end sections 30 and 32 of annular laminated article 20 are shown prior to their connection to one another in the manner described below. End sections 30 and 32 include a first, or male end section 30 and a second, or female end section 32, with each of the end sections 30 and 32 formed of a stack of planar laminas 22. End sections 30 and 32 include a first, or nominally upper, side 36 and an opposite second, or nominally lower, side 38.

First end section 30 includes a plurality of stacked laminas 22, including end laminas 40 which each have a tab 42 projecting outwardly from an end wall 44 which is defined by the collective edges of the stacked laminas 22 between end laminas 40. Tabs 42 are generally rectangular in shape, though the shape of tabs 42 may vary. Initially, as shown in FIG. 2 and prior to the displacement of tabs 42 in the manner described below, tabs 42 extend within the planes of the end laminas 40 of which tabs 42 are an integral part. As shown herein, tabs 42 are formed with end laminas 40, though as will be apparent from the further discussion below, tabs 42 may also be formed as part of laminas 22 other than the end laminas 40.

Figure 4:
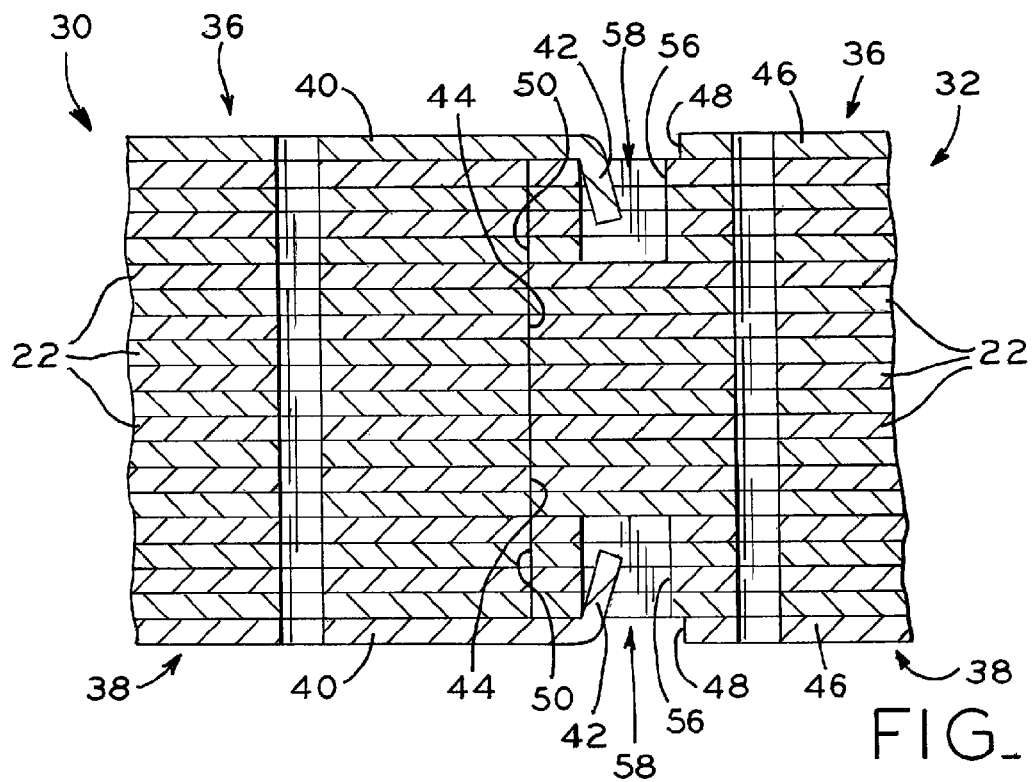
FIG. 4 is a sectional view taken along line 4-4 of FIG. 3.

Referring to FIG. 2, second end section 32 includes end laminas 46, which are respectively disposed in the same planes as end laminas 40 of first end section 30. End laminas 46 include truncated edges 48 that do not extend to an end wall 50 defined by the collective edges of the stacked laminas 22 between end laminas 46. In this manner, the laminas 22 between end laminas 46 of second end section 32 collectively form a projection 52 which is receivable within the space 54 between tabs 42 of first end section 30. At least two laminas 22 adjacent end laminas 46 on each side of second end section 32 include apertures 56 shaped to generally correspond to the shape of tabs 42, with apertures 56 aligned with one another along a direction parallel to longitudinal axis $L_1$ to define cavities 58 that extend inwardly into second end section 32 from each of the first and second sides 36 and 38 of second end section 32, as shown in FIGS. 3 and 4. Alternatively, a single cavity (not shown in FIG. 4) may extend completely through second end section 32 from first side 36 to second side 38, although it may be desired to limit the size and/or extent of cavities 58 depending on the magnetic properties desired for article 20. As described further below, when end sections 30 and 32 are brought into abutment with each other, projection 52 of second end section 32 is received within space 54 between tabs 42 of first end section 30, with tabs 42 disposed adjacent to, and overlapping, cavities 58.

As will be discussed in further detail below, end sections 30 and 32 are joined to one another by bringing end walls 44 and 50 of end sections 30 and 32, respectively, into proximity with one another, or into physical abutment with one another, followed by mechanically displacing tabs 42 from the planes of their respective laminas 40 and into coupling engagement within respective cavities 58 of second end sections 32 to secure end sections 30 and 32 together. In an exemplary embodiment, tabs 42 each extend inwardly and toward one another upon securement of end sections 30, 32 to each other.

Figure 5:
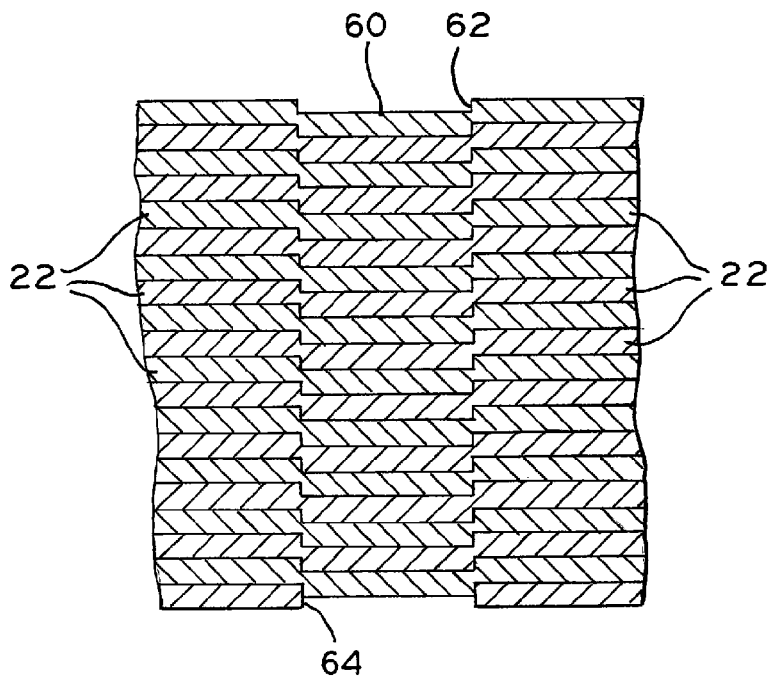
FIG. 5 is a sectional view taken along line 5-5 of FIG. 2.

Additionally, as shown in FIGS. 2 and 5, each of the laminas 22 in article 20 and end sections 30 and 32, except for the bottom-most lamina, namely, end laminas 40 and 46 on second side 38 of end sections 30 and 32, respectively, includes a plurality of interlock tabs 60 punched therein, each of which extends outwardly from the plane of the lamina to define a corresponding interlock recess 62 extending into the plane of the lamina on the opposite side of the lamina. The bottommost laminas, namely, end laminas 40 and 46 on second side 38 of end sections 30 and 32, respectively, include a set of apertures 64 which are adapted to receive the interlock tabs 60 of the next, adjacent lamina 22. Thus, other than the bottommost laminas, the interlock tabs 60 of each lamina interlock into the interlock recesses 62 of an adjacent lamina to in turn interlock all of the laminas in article 20 with one another. The foregoing interlock arrangement for interlocking laminas in a lamina stack is described in further detail in U.S. Pat. Nos. 4,619,028, 5,241,138, 5,349,741 and 6,163,949 to Neuenschwander, each assigned to the assignee of the present application, the entire disclosures of which are expressly incorporated herein by reference. Although interlock tabs 60 and recesses 62 are shown as rectangular herein, the shape of same may vary, as discussed in the foregoing patents. Although the laminas 22 of article 20 are shown and described herein as being interlocked via the use of interlock tabs 60 and recesses 62, other methods for securing the laminas with respect to one another may be used, such as by welding or by the use of pins, clamps, or other devices.

Figure 6:
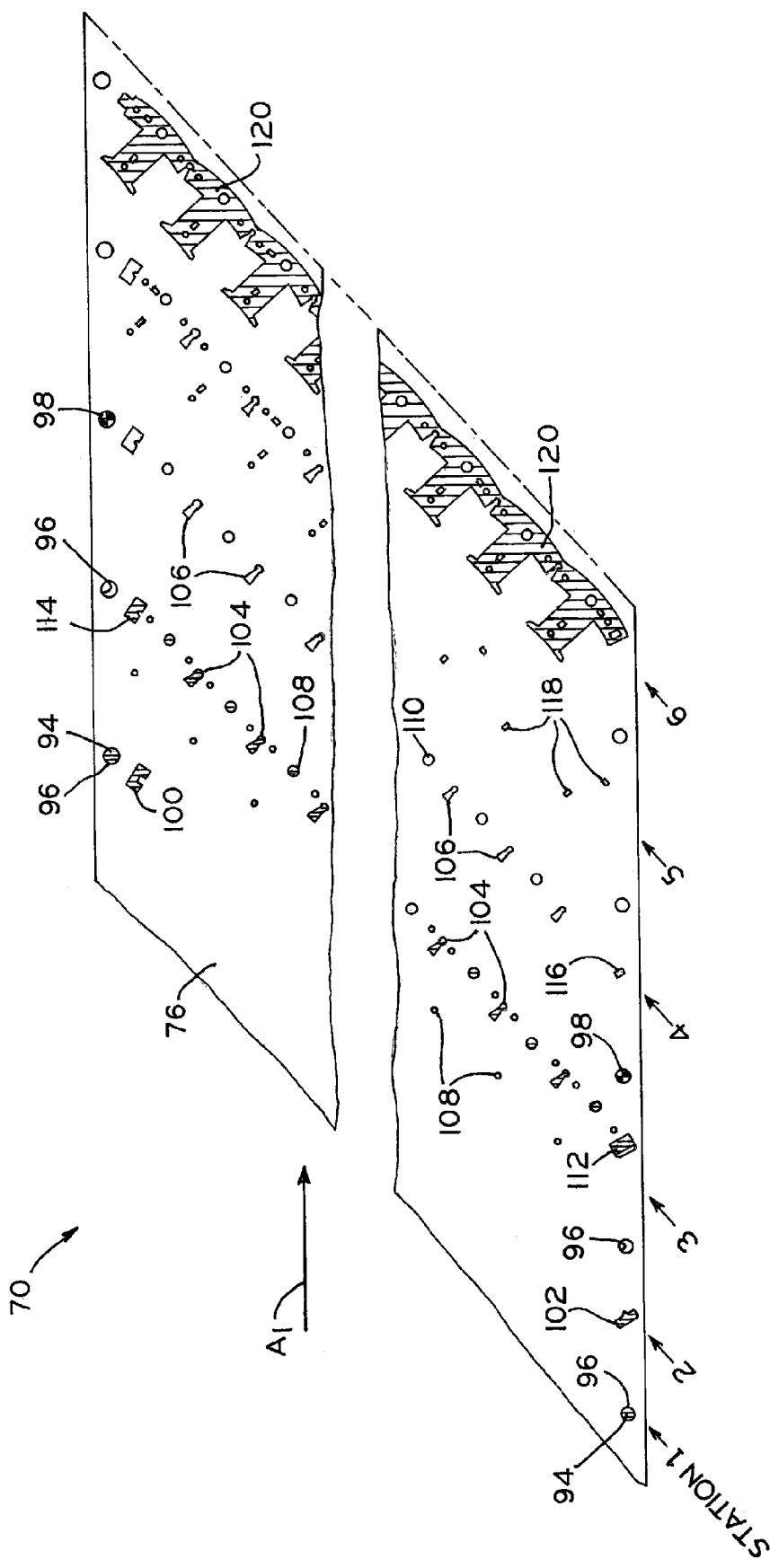
FIG. 6 is a strip layout of a die assembly used to manufacture the laminated article.
Figure 7:
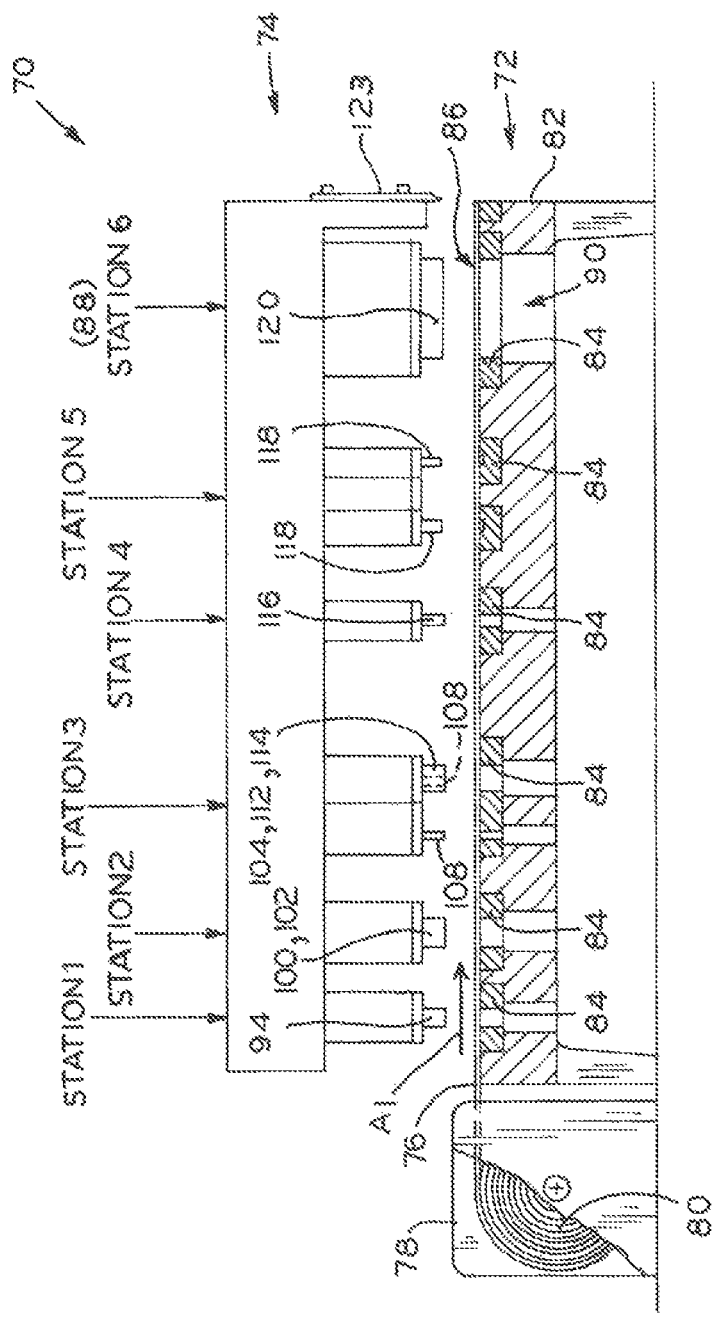
FIG. 7 is an elevational view of the die assembly of FIG. 5, viewed along the direction indicated in FIG. 6.

Referring to FIGS. 6 and 7, die assembly 70 is shown, which may be used to manufacture article 20 in its initial linear form, which article 20 includes serially connected sections 24 formed into an annular shape in the manner described below. Referring to FIG. 7, die assembly generally includes a lower die assembly 72 and an upper die assembly 74. Die assembly 70 is installed within a press (not shown) and, in operation, the press moves upper die assembly 74 upwardly and downwardly with respect to lower die assembly 72 in a known manner.

Referring to FIG. 6, it will be seen that laminated article 20 is stamped from a strip 76 of stock material at an angle with respect to the longitudinal axis of strip 76, i.e., article 20 is oriented "on a bias" with respect to strip 76 such that a strip 76 having a width which is less than the longitudinal extent of article 20 may be used. In this manner, it will be understood from the strip layout of FIG. 6 that the tooling of die assembly 70 is also aligned on the same angle and that FIG. 7, although technically a side elevational view of die assembly 70, is not taken perpendicular to the longitudinal axis of strip 76 of FIG. 6 but rather is viewed at an angle with respect to strip 76, indicated in FIG. 6, which corresponds to the angle by which article 20 is oriented with respect to strip 76. Although not illustrated herein, the tooling of die assembly 70 may also be configured in a manner in which the laminas 22 that form articles 20 are nested with respect to one another to conserve stock material.

Referring to FIGS. 6 and 7, a stock material feeder 78 is used with die assembly 70 to feed strip 76 of stock material into die assembly 70 between lower die assembly 72 and upper die assembly 74. As described below, individual laminas 22 of article 20 are shaped and blanked from strip 76 and are then stacked and interlocked within die assembly 70 to form article 20. The strip 76 is mounted within feeder 78 in the form of a coil 80, and feeder 78 is operable to feed strip 76 from coil 80 into die assembly 70 along a progression direction illustrated by arrow $A_1$ in FIGS. 6 and 7.

Still referring to FIGS. 6 and 7, lower die assembly 72 includes lower die bed 82, which may be formed as a block of carbide within the main body of lower die assembly, and a set of guide rails (not shown) are used to guide the progression of strip 76 through die assembly 70 along a feed pathway designated by arrow $A_1$. As shown in FIG. 7, lower die bed 82 of lower die assembly 72 includes a plurality of carbide die inserts 84 in operative alignment with the various punches of upper die assembly 74 for punching pilot holes and lamina features in strip 76 of stock material, and for blanking laminas 22 from strip in the manner described below. The lower die assembly 72 additionally includes choke assembly 86 at blanking station 88 (Station 6) of die assembly 70, which includes a choke cavity 90 adapted to receive laminas 22 from strip 76. Upper die assembly 74 includes a punch set having a series of individual punches which cooperate with the die inserts 84 of lower die assembly 72 to punch lamina features in strip 76, including a blanking punch at blanking station 88 of die assembly 70 for blanking, or separating, the individual laminas 22 from strip 76 which form article 20.

Referring to FIGS. 6 and 7, upper and lower die assemblies 74 and 72 together include a plurality of die stations along the feed pathway designated by arrow $A_1$ at which pilot holes and lamina features are punched in strip 76 of stock material. At Station 1, a pair of pilot hole punches 94 initially punch pilot holes 96 on opposite sides of strip 76, which pilot holes 96 are engaged by pilot pins 98 of upper die assembly 74 at various locations throughout die assembly 70 to align and locate strip 76 at each station while other punches in the punch set are performing stamping and/or blanking operations on strip 76.

At Station 2, a profile punch 100 shapes the outer profile corresponding to tab 42 of first end section 30 of article 20, and another profile punch 102 shapes the outer profile or edges of laminas 22 of second end section 32 which correspond to end wall 50 of second end section 32.

At Station 3, a first series of punches 104 punch hinge recesses 106, which including circular and diverging portions defining hinges 34 (FIG. 1A) connecting adjacent sections 24 in article 20. A second series of punches 108 punch a series of circular holes 110 which define pass-through bores in article 20. Also, at Station 3, a cropping punch 112, which is selectively actuated, punches through strip 76 to define truncated edges 48 for each end lamina 46 of second end section 32. Further details regarding the manner by which the punches of die assembly 70 may be selectively actuated, such as via pneumatic cam arrangements, for example, are disclosed in U.S. Pat. Nos. 4,619,028 and 6,163,949 to Neuenschwander, assigned to the assignee of the present invention, the disclosures of which are expressly incorporated by reference herein. Further, at Station 3, for each lamina 22 of first end section 30 that does not include a tab 42, another selectively actuated cropping punch 114 shapes the end edges of such laminas 22, which together define end wall 44 between tabs 42 of first end section 30.

At Station 4, an aperture punch 116 punches apertures 56 in second end sections 32, which punch 116 may optionally be selectively actuated. At Station 5, a series of selectively actuated punches 118 form interlock tabs 60 and recesses 62 in each of the laminas 22, except for the bottommost lamina 22, in which punches 118 are actuated to penetrate completely through strip 76 to form apertures 64.

At Station 6, a blanking punch 120 concurrently shapes the remaining profile of the individual sections 24 of article 20 and separates a lamina 22 of article 20 from strip 76 into choke assembly 86. In choke assembly 86, the laminas 22 are interlocked with one another by engagement of interlock tabs 60 of a given lamina 22 within recesses 62 of an adjacent lamina 22, which interlocking may occur substantially simultaneously with blanking of a given lamina 22 from strip 76 of stock material. Further details regarding the construction of choke assembly 86 and the manner in which laminas 22 of strip 76 are blanked from strip 76 with substantially simultaneous interlocking of the lamina 22 are disclosed in detail in U.S. Pat. Nos. 5,755,023, 6,163,949, and 7,337,531 to Neuenschwander, for example, each assigned to the assignee of the present invention, the disclosures of which are expressly incorporated herein by reference. However, in other embodiments, laminas 22 need not be interlocked with adjacent laminas 22 simultaneously with blanking of laminas 22 from strip 76. Rather, the interlocking may occur within choke assembly 86 after laminas 22 are completely blanked, or separated, from strip 76. At a subsequent station, a cutting device 123 is used to sever portions of strip 76 for collection and recycling, for example.

Figure 8:
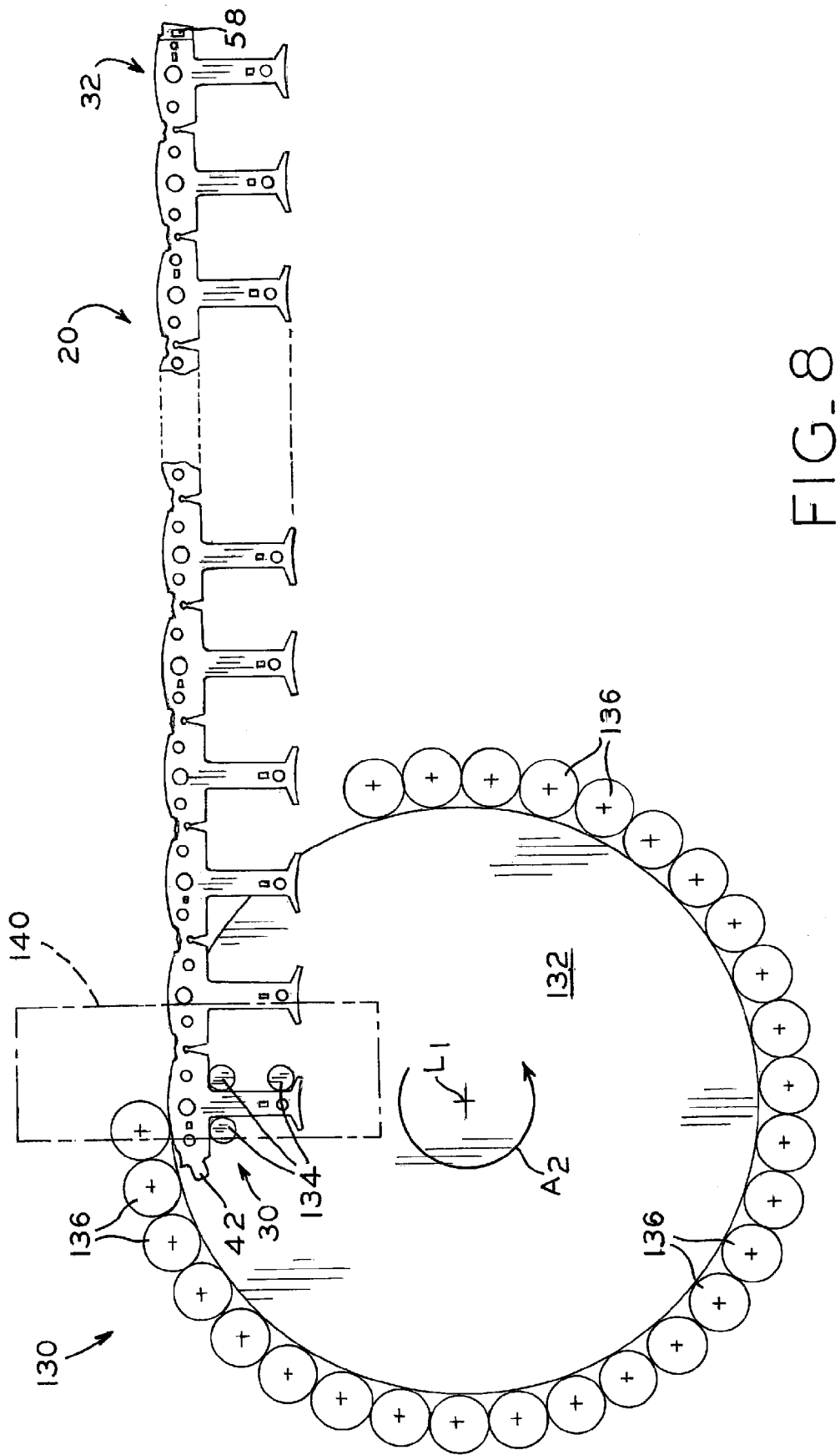
FIG. 8 is a schematic top plan view of a forming assembly, illustrating the initial forming of an annular laminated article.
Figure 9:
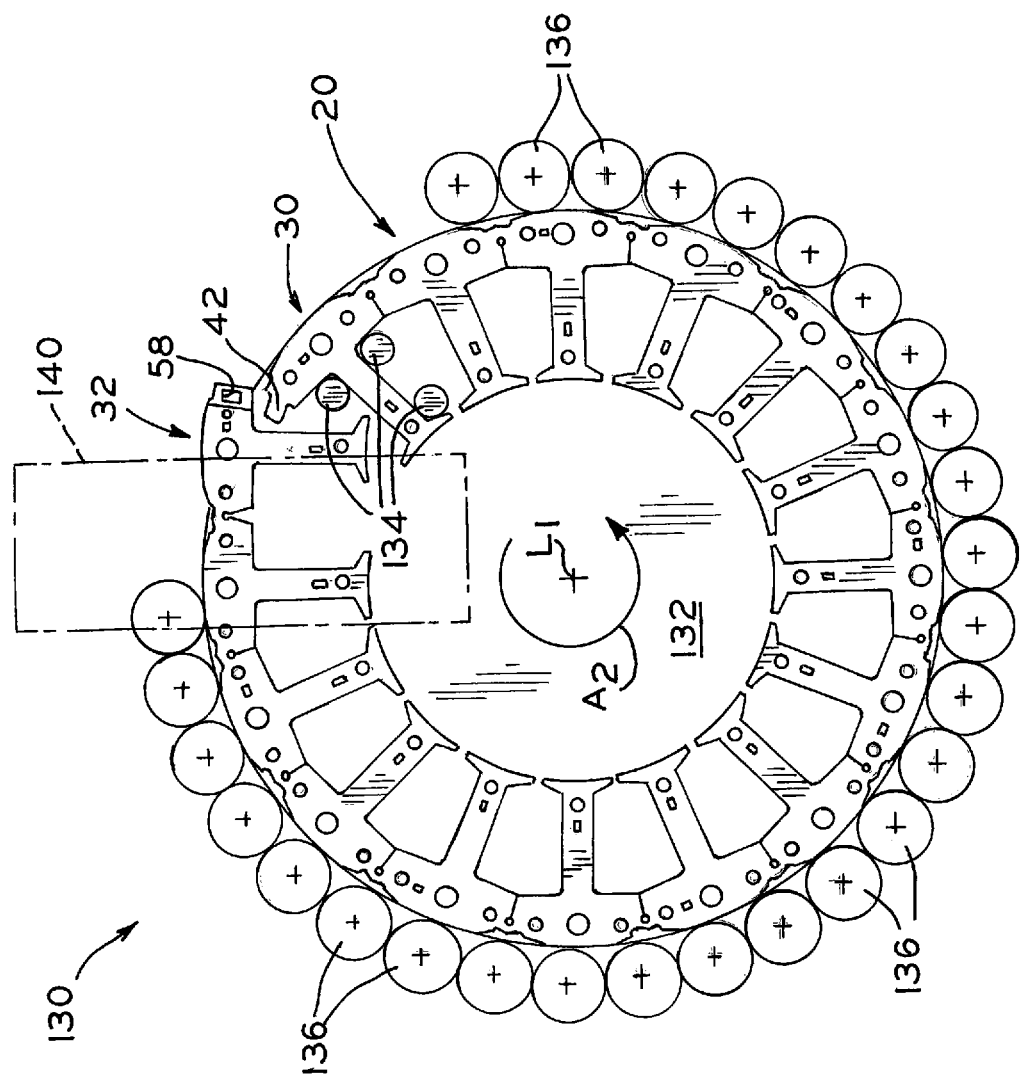
FIG. 9 is a schematic top plan view of the forming assembly of FIG. 8, illustrating a further extent of the forming of the annular laminated article, with the end sections approaching one another.
Figure 10:
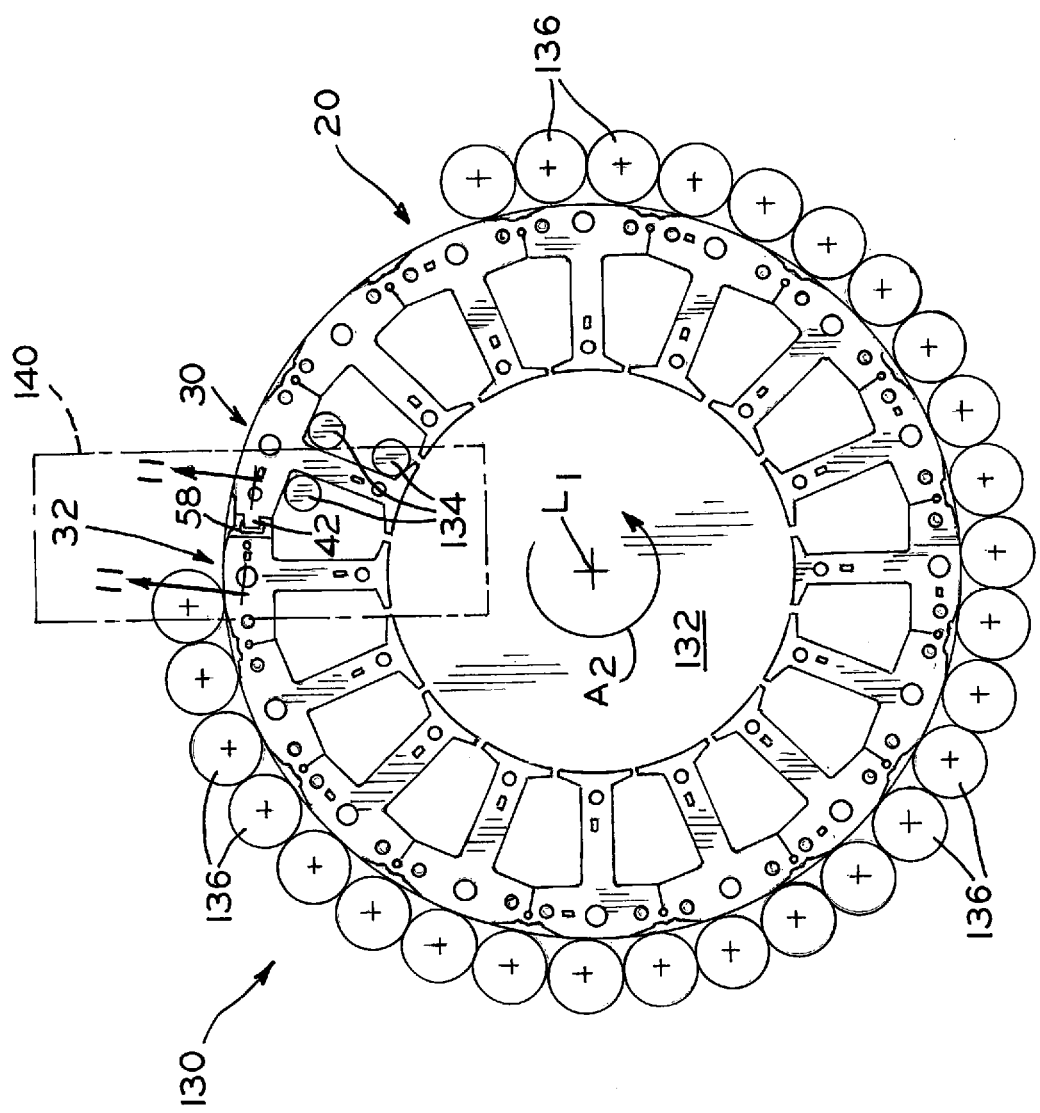
FIG. 10 is a schematic top plan view of the forming assembly of FIG. 8, illustrating a still further extent of the forming of the annular laminated article, with the end sections adjacent one another and connected.

Referring to FIGS. 8-10, an exemplary method by which article 20 is formed into an annular shape is shown, though other methods may also be used. The method by which end sections 30 and 32 are connected to one another is then shown in FIGS. 11 and 12.

Initially referring to FIGS. 8-10, linear article 20 is progressively drawn and/or fed into a forming assembly 130, which is schematically shown in FIGS. 8-10 for clarity. Forming assembly 130 includes a housing (not shown) together with a drive device (not shown) which rotates a turntable 132 having a set of pulling members 134, and also includes a substantially annular set of guide members 136 such as rollers, for example. As shown in FIG. 8, a leading end of article 20, such as first end section 30, is located with respect to a set of pulling members 134 and, referring to FIGS. 8 and 9, upon rotation of turntable 132 and pulling members 134 along the direction of arrow $A_2$, article 20 is progressively drawn into the set of guide members 136, which collectively force sections 24 of article 20 to bend about the deformable hinges 34 as article 20 is drawn or wound within the forming assembly 130 to allow article 20 to be progressively formed into an annular shape, as shown between FIGS. 8 and 9.

Referring to FIG. 9, article 20 is shown substantially completely drawn or wound into forming assembly 130 with first and second end sections 30 and 32 spaced from one another. Referring to FIG. 10, upon further progression of the operation, first and second end sections 30 and 32 are brought into an abutting relationship with one another. Specifically, with reference to FIG. 2, projection 52 of second end section 32 is received within space 54 between tabs 42 of first end section 30, end walls 44 and 50 of first and second end sections 30 and 32, respectively, are in abutting contact with one another, and tabs 42 are disposed adjacent and overlapping cavities 58.

Figure 11:
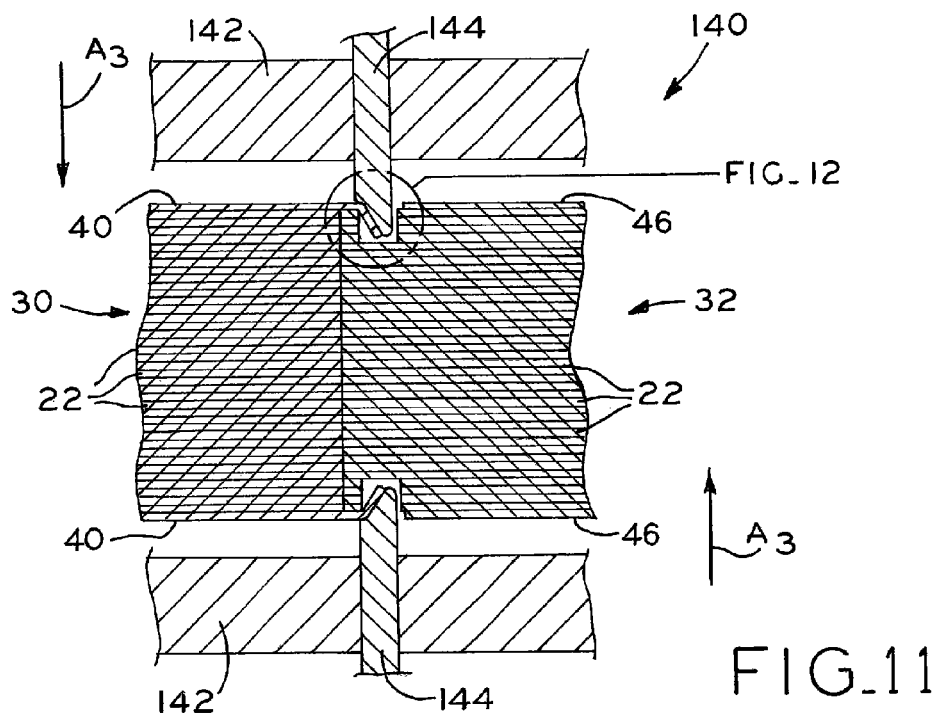
FIG. 11 is a sectional view taken through the forming tool of the forming assembly of FIGS. 8-10 along line 11-11 of FIG. 10, showing the forming tool displacing the tabs of one of the end sections into the cavities of the other of the end sections to secure the end sections to one another.
Figure 12:
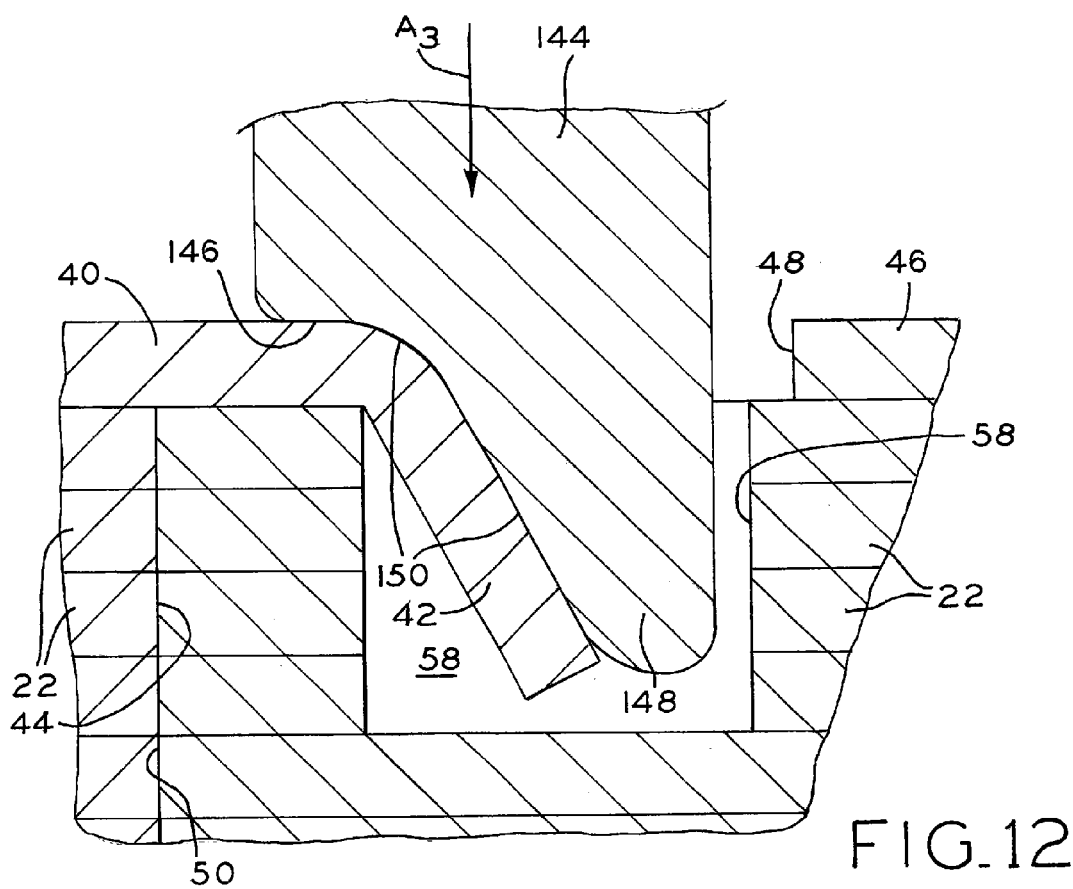
FIG. 12 is an enlarged fragmentary view of a portion of FIG. 11.

Referring to FIGS. 10-12, a clamping tool 140 is shown which operates to displace tabs 42 of first end section 30 from the planes of their respective laminas 40 into cavities 58 of second end section 32 to firmly secure first and second end sections 30 and 32 to one another. As shown in FIG. 10, clamping tool 140 may be associated with forming assembly 130 such that, upon the completion of winding of article 20 into annular form, first and second end sections 30 and 32 are properly oriented and located within clamping tool 140 to enable clamping tool 140 to operate to connect end sections 30 and 32 in the manner described below.

Referring to FIG. 11, clamping tool 140 generally includes a pair of displaceable blocks 142 associated with a reciprocating press (not shown). Each block 142 includes a forming tool 144 having a profile best shown in FIG. 12, generally including a base portion 146, a projecting tooth 148, and a profiled cam surface 150 extending between base portion 146 and tooth 148. Referring to FIGS. 11 and 12, the press is actuated to displace blocks 142 toward one another along the direction of arrows $A_3$ such that teeth 148 of forming tools 144 initially engage tabs 42 and progressively deform tabs 42 by bending to displace tabs 42 from the planes of their respective laminas 40 into cavities 58. As may be seen from FIG. 12, after initial engagement of tooth of forming tool 144, cam surface 150 will be brought into progressive engagement with tab 42 to deform tab 42 along the extent of cam surface 150, with the operation completed when base portion 146 of forming tool 144 engages or bottoms out against tab 42. In this condition, tab 42 is displaced from the plane of its respective lamina 40 to an extent such that tab 42 extends into cavity 58 and vertically overlaps at least one or more adjacent laminas 22 and possibly, multiple laminas 22, in order to firmly clamp and secure end sections 30 and 32 to one another. In particular, as shown in FIG. 12, an underside of tab 42 engages at least the corner of the lamina 22 beneath lamina 40 of tab 42. Optionally, the side edges of tab 42 may also engage the sides of cavity 58 via an interference fit. Tabs 42 may be deformed and displaced to a greater or lesser angle depending upon the material characteristics of laminas 40. The particular displacement angle of approximately 45° with respect to the plane of lamina 40 that is shown for tab 42 in FIGS. 11 and 12 is merely exemplary, and one of ordinary skill in the art will appreciate that the displacement angle of tabs 42 may vary.

Typically, clamping tool 140 will operate with end walls 44 and 50 of first and second end sections 30 and 32, respectively, first placed in firm abutment with one another by forming assembly 130 prior to displacement of tabs 42, although in other embodiments, the end walls 44 and 50 of first and second end sections 30 and 32, respectively, may merely be placed in proximity with respect to one another by forming assembly 130, and displacement of tabs 42 into cavities 58 may serve to draw end walls 44 and 50 of end sections 30 and 32 into firm abutment with one another.

As shown in FIG. 11, tabs 42 on the opposite sides 36 and 38 of first and second end sections 30 and 32 are displaceable in a mutually facing direction. Other configurations for the connection described above are also possible. For example, tabs 42 need not be associated with the end laminas 40 of first end section 30, but rather may be associated with interior laminas 22 within first end section 30. Additionally, in other embodiments, a first end section 30 may include a tab 42 on its first side 36 and a corresponding cavity 58 on its second side, while a corresponding second end section 32 may include the opposite arrangement.

In a further embodiment, rather than having a single tab 42 associated with a given cavity 58, a pair of adjacent laminas 40 of a given side of first end section 30 may each include tabs 42 which are together simultaneously and overlappingly displaced into cavity 58 by forming tool 144 to form a potentially more robust connection between first and second end sections 30 and 32.

Referring to FIGS. 13 and 14, one exemplary alternative shape for first and second end sections 30 and 32 is shown, in which first end section 30 includes several laminas 22 in its central portion having edges which extend outwardly from end wall 44 to define a projection 152, which in turn defines a pair of gaps 52 between projection 152 and tabs 42. Projection 52 of second end section 32 includes a gap 154 for receipt of projection 152. This arrangement provides a type of secondary or further physical interlocking between the laminas 22 of first and second end sections 30 and 32 to provide further rigidity to the connection between first and second end sections 30 and 32. Of course, other arrangements are possible.

Figure 15B:
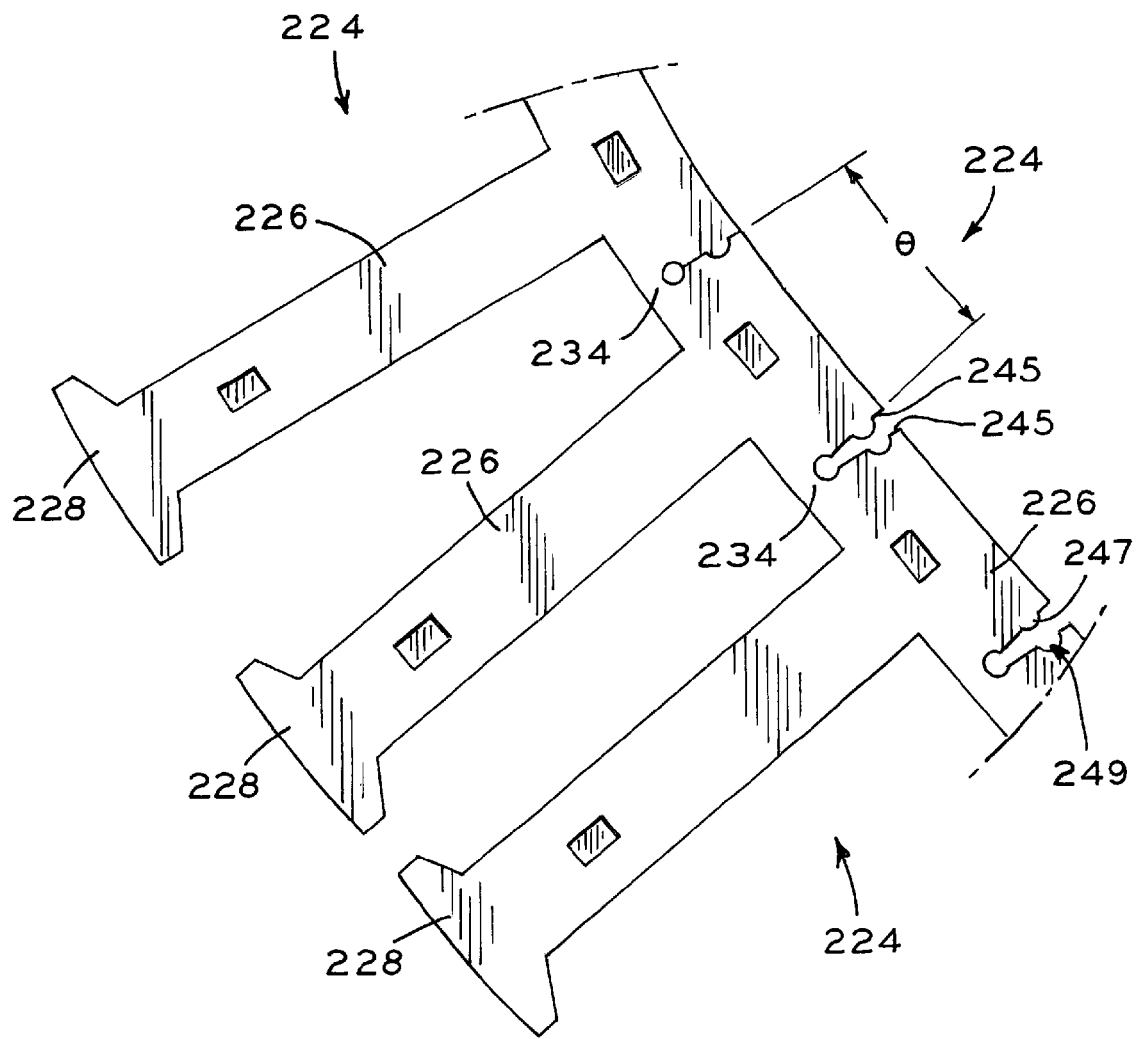
FIG. 15B is a top plan view of a portion of the annular laminated article shown in FIG. 15A.

Turning now to FIGS. 15A and 15B, an exemplary alternative laminated article 220 is shown. Article 220 is similar to article 20 described above, with reference numerals of article 220 analogous to corresponding reference numerals used in article 10, except with 200 added thereto. However, article 220 includes serially joined sections 224 having pole piece portions 228 which extend radially outwardly from core portions 226 rather than the radial inward extension of pole piece portions 28 described above. Core portions 226 are connected by hinges 234 analogous to hinges 34 connecting core portions 26 of the embodiment described above.

Planar laminas 222 are individually manufactured in an initial linear form, in a similar fashion to the manufacture of planar laminas 22 as described in detail above. However, the shape of core portion 226, and particularly the arrangement of end walls 244 thereof (FIG. 15B), are reconfigured with respect to end walls 245 of core portions 26. More particularly, end walls 245 define angle $\Theta$ (FIG. 15B) which converges away from pole piece portion 28 of each respective section 224. This convergence is the opposite of angle $\alpha$ described above with respect to sections 224, thereby establishing the outwardly extending configuration of pole piece portions 228 when planar laminas 222 are reconfigured from their as-manufactured linear form to their assembled circular form.

In addition to the reconfiguration of angle $\Theta$ described above, side walls 245 include mating protrusions 247 and cavities 249. When side walls 245 are placed into the abutting contact which results from reconfiguration of laminar article 220 from the linear form to the annular form, protrusions 247 mate and interleave with respective cavities 249. This facilitates proper alignment and spatial configuration of sections 224 with respect to one another, and help maintain such proper alignment during service. Although shown only with respect to article 220, protrusions 247 and cavities 249 can also be provided in side walls 45 of article 20 described above.

Manufacture of laminated article 220 is performed in a similar fashion to article 20 described above, except that pole pieces 228 engage the annular set of guide members 136 (FIG. 10) rather than the outer surfaces of sections 224. First and second end sections 230 and 232 are joined to one another in accordance with the descriptions given above with respect to end sections 30 and 32.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An annular laminated article, comprising:
a plurality of serially joined sections each formed of a plurality of stacked, planar laminas. said serially joined sections connected to one another by first joints that permit movement between respective adjacent pairs of said sections, said plurality of sections including a first end section and a second end section connected by a second joint comprising:
a first lamina of said first end section disposed within a plane and having at least one first tab; and
at least second and third laminas of said second end section each having apertures, said apertures aligned with one another and together defining a first cavity, said first tab displaced in non-parallel relationship from said plane of said first lamina and extending into said first cavity to secure said first and second end sections together with said first and second end sections in abutment with one another, said first tab having an end extending substantially perpendicular to said plane of said first lamina, said end further extending in a direction away from said first lamina beyond edges of said apertures of said second and third laminas.

2. The annular laminated article of claim 1. wherein said second joint further comprises:
an opposed first lamina of one of said first and second end sections disposed within a plane on a side of said first and second end sections opposite said first lamina, said opposed first lamina having an opposed first tab; and
opposed second and third laminas of the other of said first and second end sections each having apertures together defining an opposed first cavity, said first tab and said opposed first tab displaced from their respective said planes and extending into said first cavity and said opposed first cavity, respectively, to secure said first and second end sections together with said first and second end sections in abutment with one another.

3. The annular laminated article of claim 2, wherein said first tab and said opposed first tab extend inwardly toward one another.

4. The annular laminated article of claim 1, wherein said plurality of serially joined sections each include a core portion and a pole piece portion extending radially from said core portion, such that said serially joined sections cooperate with said first and second end sections to define a generally circular form of said annular laminated article.

5. The annular laminated article of claim 4, wherein said pole piece portion extends radially inwardly from said core portion when said circular form of said annular laminated article is defined.

6. The annular laminated article of claim 4, wherein said pole piece portion extends radially outwardly from said core portion when said circular form of said annular laminated article is defined.

7. The annular laminated article of claim 1, wherein said tab is bent around an edge of said aperture of said second lamina.

8. The annular laminated article of claim 1, wherein said first joints comprise deformable hinges extending between and integrally connecting said sections.

9. An annular laminated article, comprising:
a plurality of sections each formed of a plurality of stacked, planar laminas, said sections connected to one another by first joints that permit movement between respective adjacent pairs of said sections, at least one of said adjacent pairs of sections connected to one another by a second joint comprising:
a first end section including a first lamina disposed within a first plane, said first lamina having at least one first tab; and
a second end section including at least second and third adjacent laminas disposed within respective second and third planes, said second and third laminas having respective aligned apertures together defining a first cavity, said first tab displaced in non-parallel relationship from said first plane of said first lamina and received within said first cavity to secure said first and second end sections together, said first tab having an end extending substantially perpendicular to said plane of said first lamina, said end further extending in a direction away from said first lamina beyond edges of said apertures of said second and third laminas.

10. The annular laminated article of claim 9, wherein said first end section includes at least one additional lamina adjacent said first lamina, said additional lamina including an end edge in abutment with an end edge of one of said second and third laminas.

11. The annular laminated article of claim 9, wherein said first, second, and third laminas are disposed on a first side of said first and second end sections, said first and second end section further including a second side opposite said first side with said at least one joint further comprising:
one of said first and second end sections including a fourth lamina disposed within a fourth plane, said fourth lamina having at least one second tab; and
the other of said first and second end sections including at least fifth and sixth adjacent laminas disposed within respective fifth and sixth planes, said fifth and sixth laminas having respective aligned apertures together defining a second cavity, said second tab displaced from said sixth plane and received within said second cavity to secure said first and second end sections together.

12. The annular laminated article of claim 11, wherein said first tab and said second tab extend inwardly toward one another.

13. The annular laminated article of claim 9, wherein said plurality of serially joined sections each include a core portion and a pole piece portion extending radially from said core portion, such that said serially joined sections cooperate with said first and second end sections to define a generally circular form of said annular laminated articles.

14. The annular laminated article of claim 13, wherein said pole piece portion extends radially inwardly from said core portion when said circular form of said annular laminated article is defined.

15. The annular laminated article of claim 13, wherein said pole piece portion extends radially outwardly from said core portion when said circular form of said annular laminated article is defined.

16. The annular laminated article of claim 9, wherein said tab is bent around an edge of said aperture of said second lamina.

17. The annular laminated article of claim 9, wherein said first joints comprise deformable hinges extending between and integrally connecting said sections.

18. A method for securing end sections of a laminated article, said method comprising the steps of:
manufacturing a laminated article formed of a plurality of serially joined sections, each section formed of a plurality of stacked, planar laminas disposed within a respective plurality of parallel planes;
forming the article into annular form by moving the sections with respect to one another about first joints connecting respective adjacent pairs of the sections with the end sections adjacent one another; and
displacing at least one tab extending from a first lamina of one of the end sections into non-parallel relationship from the planes of the laminas and into a corresponding cavity of the other of the end sections to secure the end sections together, the tab having an end extending substantially perpendicular to the planes of the laminas, the end further extending in a direction away from the first lamina beyond edges of at least two of the laminas of the other end section.

19. The method of claim 18, wherein said displacing step further comprises displacing a pair of tabs each associated with one of the end sections into corresponding respective cavities each associated with the other of the end sections said tabs displaced toward one another.

20. The method of claim 18, further comprising drawing the end sections into engagement with one another, prior to said displacing step.

21. The method of claim 18, wherein said displacing step comprises driving a forming tool into the corresponding cavity to deform the at least one tab out of a planar configuration and into the cavity.

22. The method of claim 21, wherein the forming tool includes a base portion and a projecting tooth having a profiled cam surface extending therebetween, said displacing step comprising initially engaging the tooth of the forming tool with the at least one tab, deforming the at least one tab along the extent of the cam surface, and completing said displacing step when the base portion engages the at least one tab.

23. The method of claim 18, wherein said displacing step further comprises bending the tab around an edge of an aperture of a lamina of the other of the end sections, the aperture at least partially defining the cavity.

24. The method of claim 18, wherein said forming step further comprises bending respective adjacent pairs of the sections about deformable hinges extending between and integrally connecting the sections.

* * * * *